(12) United States Patent
Savoie

(10) Patent No.: US 8,680,703 B2
(45) Date of Patent: Mar. 25, 2014

(54) WAVE ENERGY HARNESSING MECHANISM

(76) Inventor: Yves Savoie, New Richmond (CA)

( * ) Notice: Subject to any disclaimer, the term of this patent is extended or adjusted under 35 U.S.C. 154(b) by 350 days.

(21) Appl. No.: 13/180,651

(22) Filed: Jul. 12, 2011

(65) Prior Publication Data

US 2012/0032445 A1     Feb. 9, 2012

(30) Foreign Application Priority Data

Aug. 3, 2010 (GB) ................................. 1013036.7

(51) Int. Cl.
*F03B 13/10* (2006.01)
*F03B 13/12* (2006.01)
*H02P 9/04* (2006.01)

(52) U.S. Cl.
USPC .......................................................... 290/53

(58) Field of Classification Search
USPC ......................................... 290/42, 43, 53, 54
See application file for complete search history.

(56) References Cited

U.S. PATENT DOCUMENTS

| | | | |
|---|---|---|---|
| 1,439,984 | A | 12/1922 | Talbert |
| 3,546,473 | A | 12/1970 | Rich |
| 3,696,251 | A | 10/1972 | Last et al. |
| 3,895,236 | A | 7/1975 | Herron |
| RE31,111 | E | 12/1982 | Hagen |
| 4,392,349 | A | 7/1983 | Hagen |
| 4,539,485 | A | 9/1985 | Neuenschwander |
| 4,754,157 | A | 6/1988 | Windle |
| 4,850,190 | A | 7/1989 | Pitts |
| 5,347,186 | A | 9/1994 | Konotchick |
| 5,554,922 | A | 9/1996 | Kunkel |
| 7,199,481 | B2 | 4/2007 | Hirsch |
| 7,323,790 | B2 * | 1/2008 | Taylor et al. .................... 290/42 |

* cited by examiner

*Primary Examiner* — Javaid Nasri

(57) ABSTRACT

A wave energy harnessing mechanism comprising a grid of piston members interconnected at respective ends thereof. Each of the piston member includes a hollow chamber with a driving shaft, a movable magnet, and a coil therein, wherein the driving shafts are adapted to move the magnets back and forth through the coils and thereby induce an electric current within the coils. A plurality of cables interconnecting the coils of the piston members that are adapted and used to transfer the electric current generated within the coils to a storage accumulator located a distance therefrom.

2 Claims, 4 Drawing Sheets

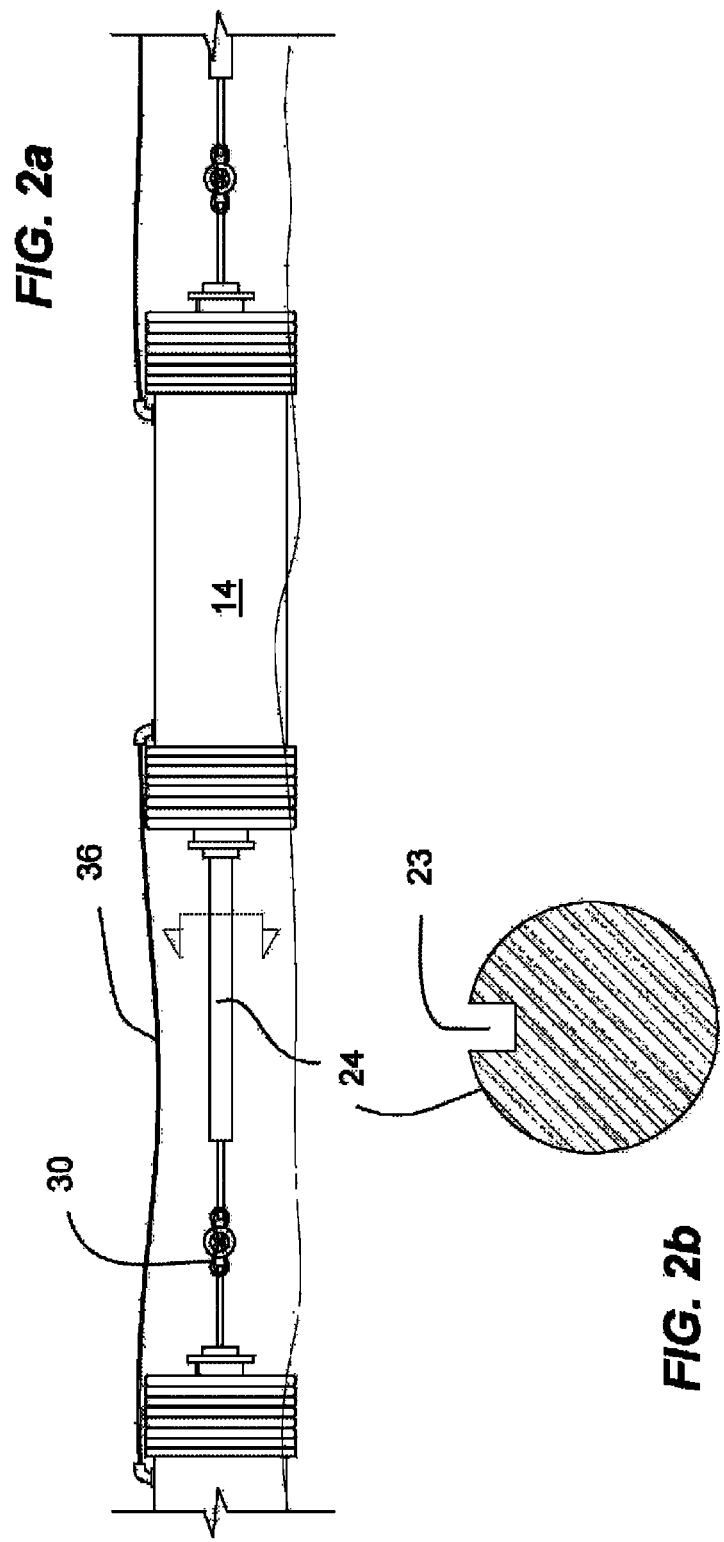

WAVE ENERGY HARNESSING MECHANISM

This application claims priority based on request GB1013036.7 filed Aug. 3, 2010.

FIELD OF THE INVENTION

The present invention relates generally to energy generating devices but more particularly to a device that captures the energy from waves.

BACKGROUND OF THE INVENTION

Renewable energy sources are quite popular these days and there are always new ways to better harness the energy potential from clean and renewable sources such as the sun, the wind and even the waves from oceans and seas.

SUMMARY OF THE INVENTION

In view of the foregoing disadvantages inherent in the known devices now present in the prior art, the present invention, which will be described subsequently in greater detail, is to provide objects and advantages which are:

To provide for an improved way of harnessing wave energy.

To attain these ends, the present invention generally comprises a grid of piston members interconnected at respective ends thereof; each of the piston member include a hollow chamber with a driving shaft, a movable magnet, and a coil compartment with at least one coil therein, wherein the driving shafts are adapted to move the magnets back and forth through the coil compartments and thereby induce an electric current within the coil compartments.

A plurality of cables interconnecting the coil compartments of the piston members that are adapted and used to transfer the electric current generated within the coil compartments to a storage accumulator located a distance therefrom.

The magnet is attached to an end portion of the driving shaft and is movable axially back and forth through the coil compartments within the hollow chamber as the piston member is pulled and pushed back and forth by the waves when passing through the grid. A pair of biasing members are placed on either side of the magnet and are adapted to push the magnet back to its original position.

Each of the piston member further includes an electronic control circuit adapted to regulate the electricity produced therein.

There is a bank of accumulators located a distance from the grid, and connected thereto by one of the cables, and adapted to store the electric current generated by the coil compartments.

Each coil includes a series of windings, wherein each winding has successively larger number of turns therein; and a winding selector switch, such that the amount of electricity generated by each of the coil compartments can be chosen and controlled.

Each of the winding selector switch can be controlled remotely via electronic signals sent through the cables.

Each of the control circuit can be controlled remotely via electronic signals sent through the cables.

The piston members are interconnected at respective ends thereof via rings and clips, wherein each end of each piston member includes a ring, and wherein each ring of adjacent ends of each piston member are interconnected by clips.

Each of the driving shaft include a notch and each chamber has a rib extending therefrom and engaging the notch. Both the notch and the rib cooperate to prevent rotation of the shaft within their respective chamber.

Each of the driving shaft include a notch therein that is adapted to prevent rotation of each shaft within their respective chamber wherein a rib engages into the notch to prevent the rotation.

The cables are removably connected to each the piston member using cable connector members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 2a-b Side view of a grid and cutaway view of a driving shaft.

DETAILED DESCRIPTION OF THE PREFERRED EMBODIMENT

Figure 1:
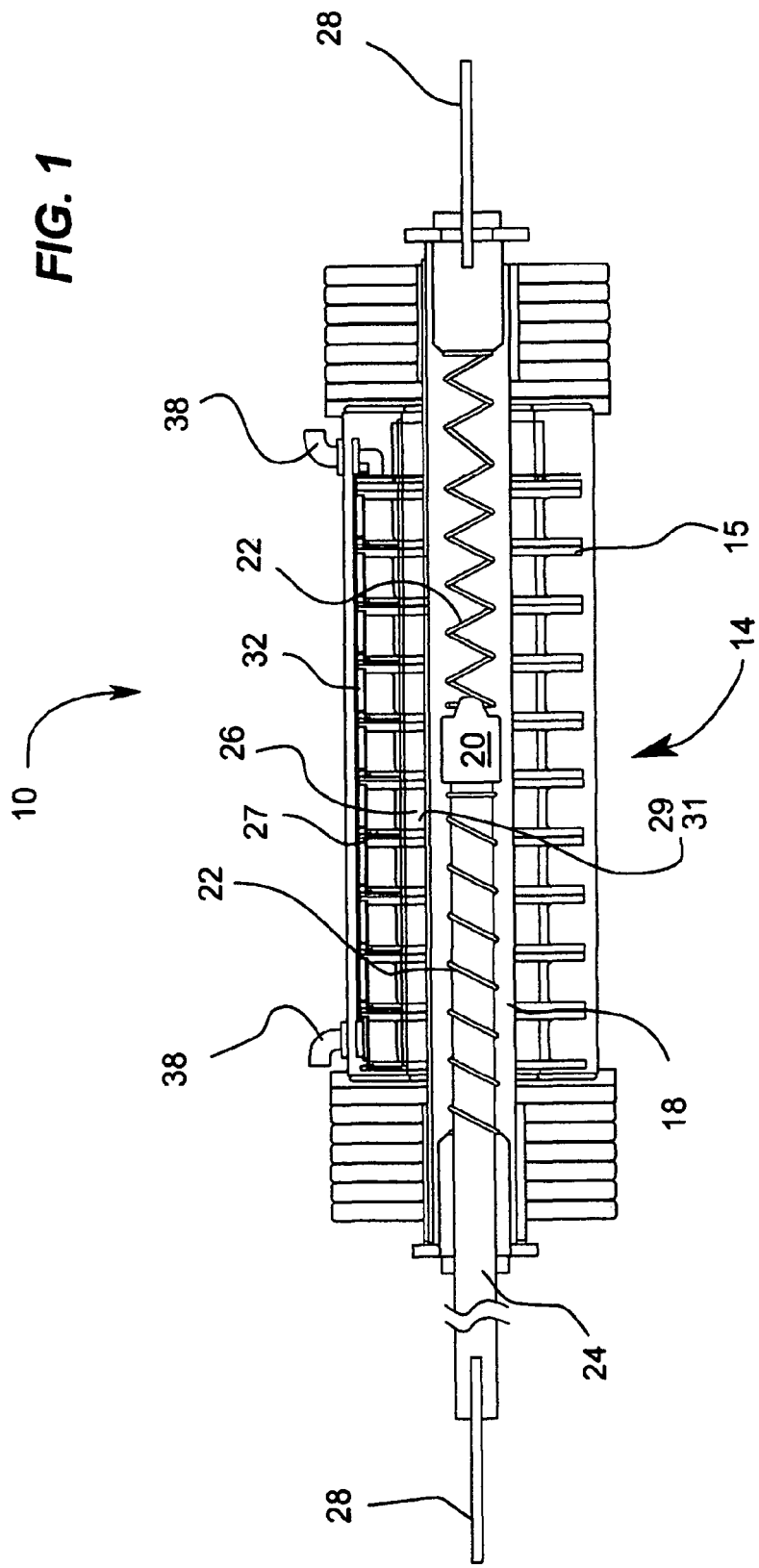
FIG. 1 Cutaway side view of the invention.
Figure 3:
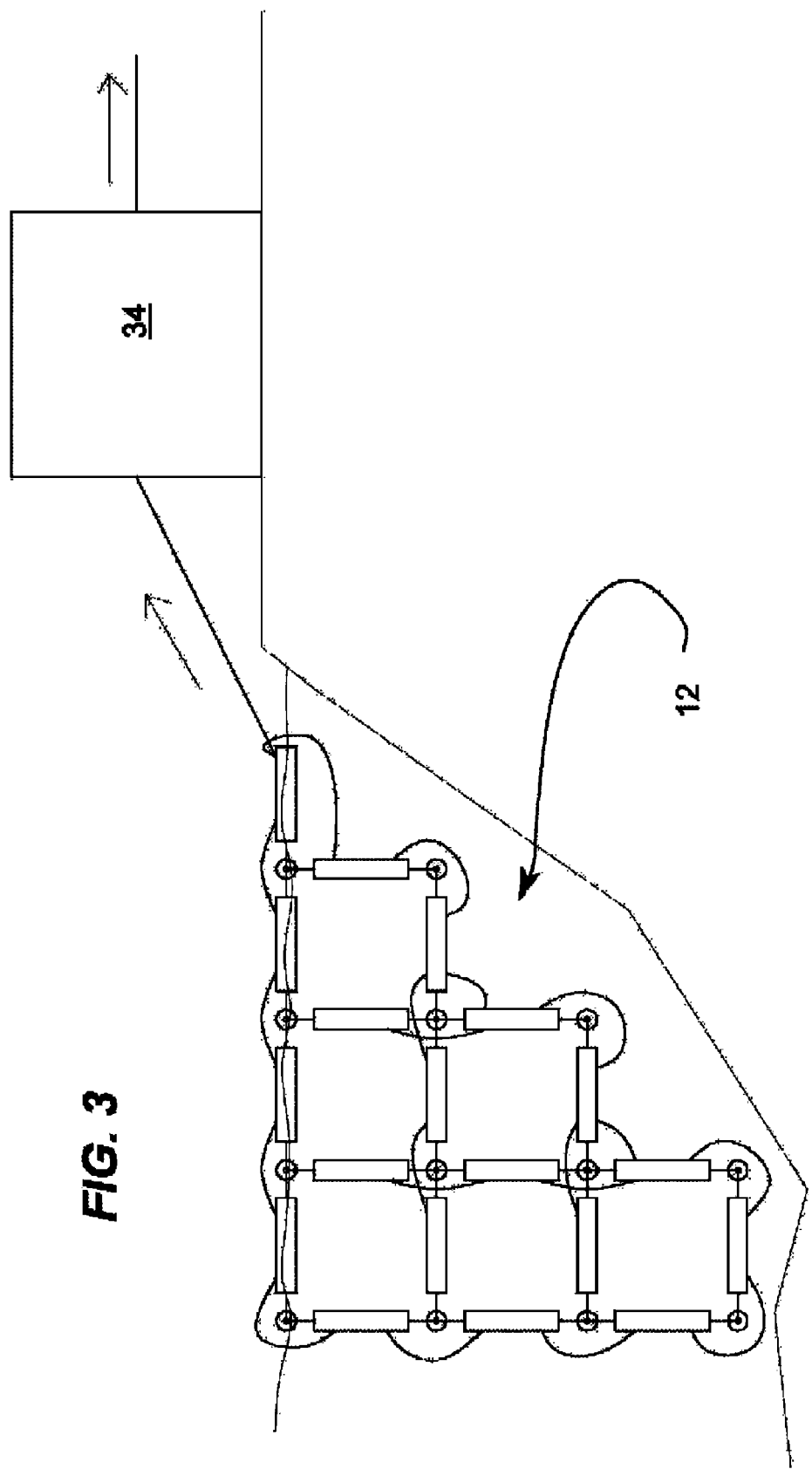
FIG. 3 Side view of the grid.
Figure 4:
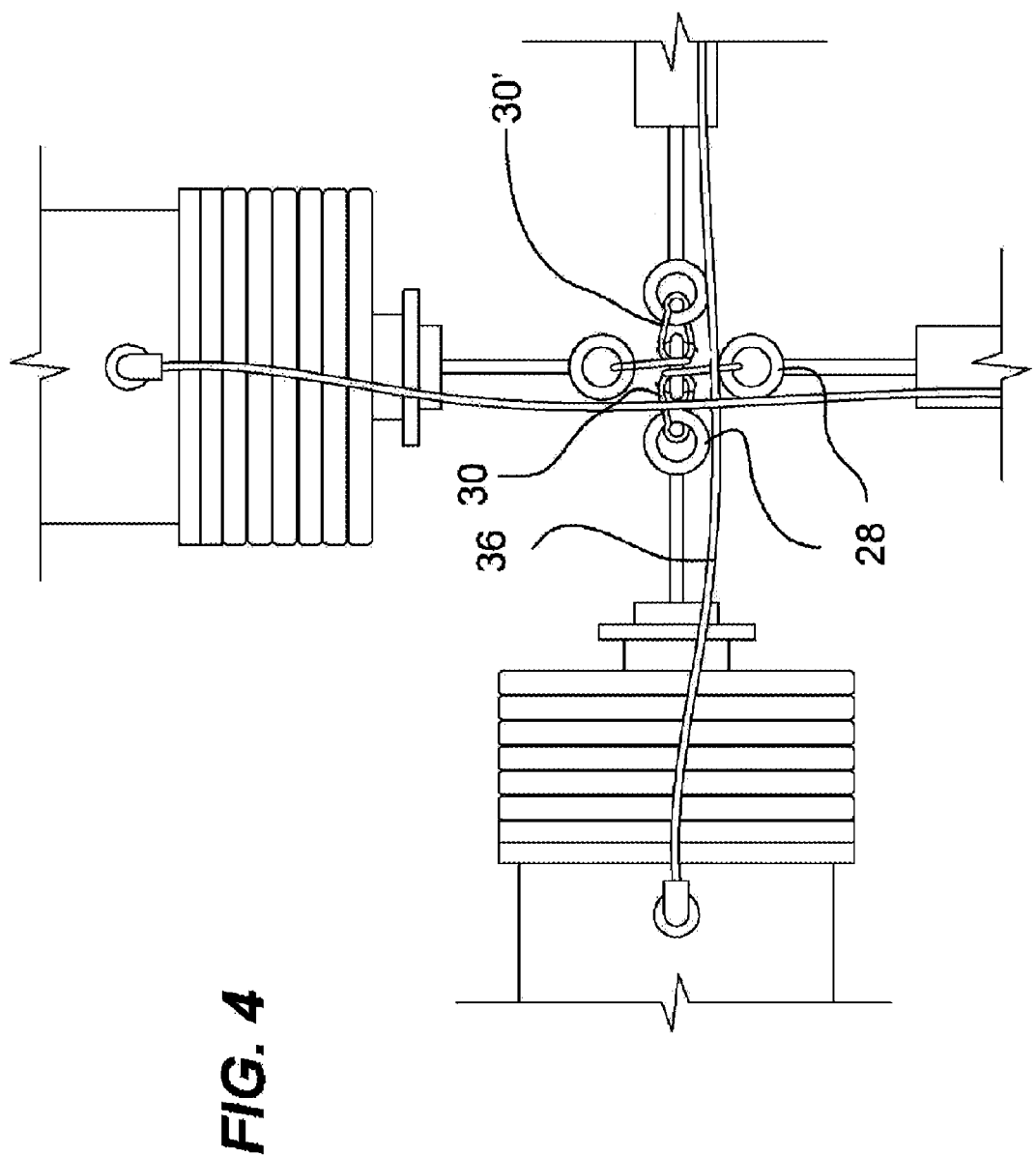
FIG. 4 Top view of clips.

A wave energy harnessing mechanism (10) consists in a grid (12) of piston members (14). Each piston member (14)

has a neutral buoyancy and so do all other components making up the grid (12) so that it is buoyantly neutral.

The piston member (14) is generally cylindrical in shape and has a hollow chamber (18) at its center along its longitudinal axis. This hollow chamber (18) is partially filled by a moving magnet (20), a pair of biasing means (22), and a driving shaft (24) that actuates the magnet (20) inside the hollow chamber (18) so that it induces an electrical current into at least one coil compartment (26) located around the hollow chamber (18). The coil compartments (26) contain at least one coil (29) each. The driving shaft (24) has a notch (23) and each chamber (18) has a rib (15) which forms an integral part of the piston member (14) engaging the notch (23). Both the notch (23) and the rib (not shown) cooperate to prevent rotation of the shaft (24) within their respective chamber (18). Water is allowed to enter into to hollow chamber (18) but the coil compartments (26) are sealed from the water. Water enters from the opposite end of the driving shaft (24). By letting water circulate within the hollow chamber (18) it eliminates the need to have a totally sealed hollow chamber (18) devoid of air but rather uses the fact that the environment outside as well as inside the piston member (14) consists of water.

The distal end of the piston (24) has a ring (28) used for connecting a clip (30) such as a carabiner, for example. The opposite end of the piston member (14) also has a ring (28) through which passes another clip (30').

As waves pass through the grid (12) the distance between the piston members (14) varies, this pulls and pushes on the shaft (24), which in turn, actuates the magnet (20), which leads to the production of electricity.

Depending upon the strength of the waves, a varying amount of electricity can be produced in two different ways. First, as the magnet (20) moves deeper into the hollow chamber (18), more coils (not shown) are induced by the magnet (20). Second, more resistance can be created by connecting more windings (31) on each coil compartment (26) by way of a winding selector switch (27) which connects more windings (not shown). For example, the coil (not shown) can have a first winding of 5,000 turns and another winding which totals 10,000 turns. If four such separate windings are selected by the winding selector, that would give a total of 20,000 turns.

Because coils and windings are known in the art, no further discussion is needed for the purpose of this invention.

An electronic control circuit (32) regulates power distribution, according to the quantity of electricity produced. Since the frequency of the alternative current produced is uneven, it may be necessary to convert it to DC for later reconversion into AC. Also, there could be a bank of accumulators (34) located offshore close to the grid (12) so as to store electricity so as to make it available on a fairly consistent basis. Cables (36) connect each piston member (14) by way of cable connectors (38). This aspect of power distribution is also well known in the art and need not be further discussed.

The winding selector switch (27) is remotely controlled and so is electronic control circuit (32). Both by way of electronic signal piggybacking on the cables (36).

All matters relating to buoyancy and structural integrity of the grid (12) as it relates to variations caused by currents, tides, wind, variations in water temperature and salinity which could affect the buoyancy of the grid as a whole are matters of design solved by engineers and as such, go beyond the scope of the specifics related to the production of electricity described hereinabove and need not be further discussed here.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A wave energy harnessing mechanism comprising a grid of piston members interconnected at respective ends thereof; each said piston member including a hollow chamber with a driving shaft, driven by a wave, a movable magnet, and a coil compartment having at least one coil therein, wherein said driving shafts are adapted to move said magnets back and forth through said coil compartments and thereby induce an electric current within said coil compartments; and a plurality of cables interconnecting said coils of said piston members that are adapted and used to transfer said electric current generated within said coil compartments to a storage accumulator located a distance therefrom; inside each said hollow chamber of each said piston member, said magnet is attached to an end portion of said driving shaft and is movable axially back and forth through said coil compartments within said hollow chamber as said piston member is pulled and pushed back and forth by waves when passing through said grid; and wherein a pair of biasing members are placed on either side of said magnet and are adapted to push said magnet back to its original position; each said piston member further includes an electronic control circuit adapted to regulate the electricity produced therein; a bank of accumulators located a distance from said grid, and connected thereto by one of said cables, and adapted to store said electric current generated by said coil compartments; each coil includes a series of windings, wherein each winding has successively larger number of turns therein; and a winding selector switch, such that the amount of electricity generated by each said coil compartment can be chosen and controlled; each said winding selector switch can be controlled remotely via electronic signals sent through said cables; each said control circuit can be controlled remotely via electronic signals sent through said cables; said piston members are interconnected at respective ends thereof via rings and clips, wherein each end of each piston member includes a ring, and wherein each ring of adjacent ends of each piston member are interconnected by clips; each said driving shaft includes a notch and each chamber has a rib extending therefrom and engaging said notch; both said notch and said rib cooperating to prevent rotation of said shaft within their respective chamber.

2. The wave energy harnessing mechanism of claim 1, wherein said cables are removably connected to each said piston member using cable connector members.

* * * * *